US007725996B2

(12) United States Patent
Li et al.

(10) Patent No.: US 7,725,996 B2
(45) Date of Patent: Jun. 1, 2010

(54) METHOD FOR PRODUCING ACTUATOR DEVICE

(75) Inventors: Xin-Shan Li, Nagano-ken (JP); Tsutomu Nishiwaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 800 days.

(21) Appl. No.: 11/501,032

(22) Filed: Aug. 9, 2006

(65) Prior Publication Data

US 2007/0033784 A1 Feb. 15, 2007

(30) Foreign Application Priority Data

| | | | |
|---|---|---|---|
| Aug. 9, 2005 | (JP) | ............................. | 2005-230792 |
| Jul. 12, 2006 | (JP) | ............................. | 2006-192068 |

(51) Int. Cl.
*H02N 2/00* (2006.01)
*H04R 17/00* (2006.01)
*H04R 31/00* (2006.01)

(52) U.S. Cl. .......................... 29/25.35; 29/874; 29/885; 29/890.1; 204/192.17; 310/311; 310/317; 310/363

(58) Field of Classification Search ................ 29/25.35, 29/890.1, 874, 885; 310/311, 317, 345, 363, 310/328; 204/192.17
See application file for complete search history.

(56) References Cited

U.S. PATENT DOCUMENTS 6,326,621 B1 * 12/2001 Kamada et al. .......... 250/338.2
2005/0168524 A1 8/2005 Xin-Shan et al.
2008/0034563 A1 2/2008 Xin-Shan et al.

FOREIGN PATENT DOCUMENTS

| | | | |
|---|---|---|---|
| CN | 1621233 | A | 6/2005 |
| JP | 5-286131 | A | 11/1993 |
| JP | 9-323416 | A | 12/1997 |
| JP | 10-264384 | A | 10/1998 |
| JP | 11-87791 | A | 3/1999 |
| JP | 2000-94688 | A | 4/2000 |
| JP | 3209082 | B2 | 7/2001 |
| JP | 2004-128492 | A | 4/2004 |
| JP | 2005-176433 | A | 6/2005 |

* cited by examiner

*Primary Examiner*—A. Dexter Tugbang
*Assistant Examiner*—Livius R Cazan
(74) *Attorney, Agent, or Firm*—Sughrue Mion PLLC

(57) ABSTRACT

A method for producing an actuator device, comprising the steps of: forming a vibration plate on a substrate; and forming a piezoelectric element composed of a lower electrode, a piezoelectric layer, and an upper electrode on the vibration plate, wherein in the step of forming the piezoelectric element, the upper electrode is formed on the piezoelectric layer by sputtering, a temperature of 25 to 250 (° C.) and a pressure of 0.4 to 1.5 (Pa) are used during the sputtering, and upon the sputtering, the upper electrode having a thickness of 30 to 100 (nm), stress of 0.3 to 2.0 (GPa), and specific resistance of 2.0 ($\times 10^{-7}$ Ω·m) or less is formed.

2 Claims, 8 Drawing Sheets

METHOD FOR PRODUCING ACTUATOR DEVICE

The entire disclosure of Japanese Patent Applications Nos. 2005-230792 filed Aug. 9, 2005 and 2006-192068 filed Jul. 12, 2006 is expressly incorporated by reference herein.

BACKGROUND

1. Technical Field

The present invention relates to a method for producing an actuator device having on a vibration plate a piezoelectric element composed of a lower electrode, a piezoelectric layer consisting of a piezoelectric material, and an upper electrode; the actuator device; and a liquid-jet head and a liquid-jet apparatus using the actuator device.

2. Related Art

An example of a piezoelectric element for use in an actuator device is a combination of a piezoelectric layer comprising a piezoelectric material showing an electromechanical transducer function, for example, a crystallized piezoelectric ceramic, and two electrodes, i.e., a lower electrode and an upper electrode, sandwiching the piezoelectric layer. Such an actuator device is generally called an actuator device in the flexural vibration mode, and is used, for example, in a liquid-jet head. A representative example of the liquid-jet head is an ink-jet recording head in which a part of a pressure generating chamber communicating with a nozzle orifice for ejection of ink droplets is composed of a vibration plate, and the vibration plate is deformed by a piezoelectric element to pressurize ink in the pressure generating chamber, thereby ejecting ink droplets through the nozzle orifice. An example of the actuator device installed in the ink-jet recording head has a piezoelectric element formed by forming a uniform piezoelectric material layer on the entire surface of the vibration plate by film lamination technology, and cutting the piezoelectric material layer into shapes corresponding to the pressure generating chambers by lithography to form the piezoelectric element for each of the pressure generating chambers (see, for example, JP-A-5-286131 (FIG. 3, paragraph [0013])).

The actuator device having such a piezoelectric element is advantageous in that the piezoelectric elements can be fabricated with high density by lithography, which is a precise and convenient method, and that the piezoelectric element can be thinned, enabling high speed driving. However, the problems arise that the piezoelectric element formed in this manner undergoes film peeling or delamination due to the film quality or film stress of each film constituting the piezoelectric element. In particular, the upper electrode, which is the uppermost layer of the piezoelectric element, is apt to peel off the piezoelectric layer.

To adjust the stress of the film constituting the piezoelectric element, a stress relaxation layer may be provided between the piezoelectric layer and the opposed film (for example, JP-A-2004-128492 (Claims)). Such a configuration can be expected to prevent, to some degree, the delamination of the film constituting the piezoelectric element. However, the problem is likely to occur that the piezoelectric characteristics of the piezoelectric layer decline, failing to obtain the desired amount of displacement when the piezoelectric element is driven.

Of course, such problems exist not only in the actuator device installed in the liquid-jet head such as an ink-jet recording head, but similarly in the actuator device installed in every other apparatus.

SUMMARY

An advantage of some aspects of the present invention is to provide a method for producing an actuator device, which can keep the piezoelectric characteristics of a piezoelectric layer satisfactory, and can prevent the delamination of an upper electrode; the actuator device; and a liquid-jet head and a liquid-jet apparatus having the actuator device.

According to an aspect of the invention, there is provided a method for producing an actuator device, comprising the steps of: forming a vibration plate on a substrate; and forming a piezoelectric element composed of a lower electrode, a piezoelectric layer, and an upper electrode on the vibration plate, wherein in the step of forming the piezoelectric element, the upper electrode is formed on the piezoelectric layer by sputtering; a temperature of 25 to 250 (° C.) and a pressure of 0.4 to 1.5 (Pa) are used during the sputtering; and upon the sputtering, the upper electrode having a thickness of 30 to 100 (nm), stress of 0.3 to 2.0 (GPa), and specific resistance of 2.0 ($\times 10^{-7}$ Ω·m) or less is formed.

According to this aspect, the adhesion of the upper electrode to the piezoelectric layer is ensured, so that the film quality of the upper electrode can be improved, with the piezoelectric characteristics of the piezoelectric layer being kept satisfactory. Thus, an actuator device excellent in displacement characteristics and durability can be realized.

It is preferable that a power density during formation of the upper electrode be set at 3 to 30 ($kW/m^2$).

By so doing, the upper electrode having the desired stress can be formed more reliably.

It is also preferable that iridium (Ir) be used as a material for the upper electrode.

The use of a predetermined material for the upper electrode can improve the film quality of the upper electrode more reliably.

According to another aspect of the invention, there is provided an actuator device produced by the above method.

According to this aspect, an actuator device markedly improved in displacement characteristics and durability can be realized.

According to still another aspect of the invention, there is provided a liquid-jet head including the above actuator device.

According to this aspect, a liquid-jet head exhibiting satisfactory ejection characteristics and markedly improved in durability can be realized.

According to a further aspect of the invention, there is provided a liquid-jet apparatus including the above liquid-jet head.

According to this aspect, a liquid-jet apparatus improved in ejection characteristics and durability, and thus markedly improved in reliability, can be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

The present invention will now be described in detail based on the embodiments offered below.

Embodiment 1

Figure 1:
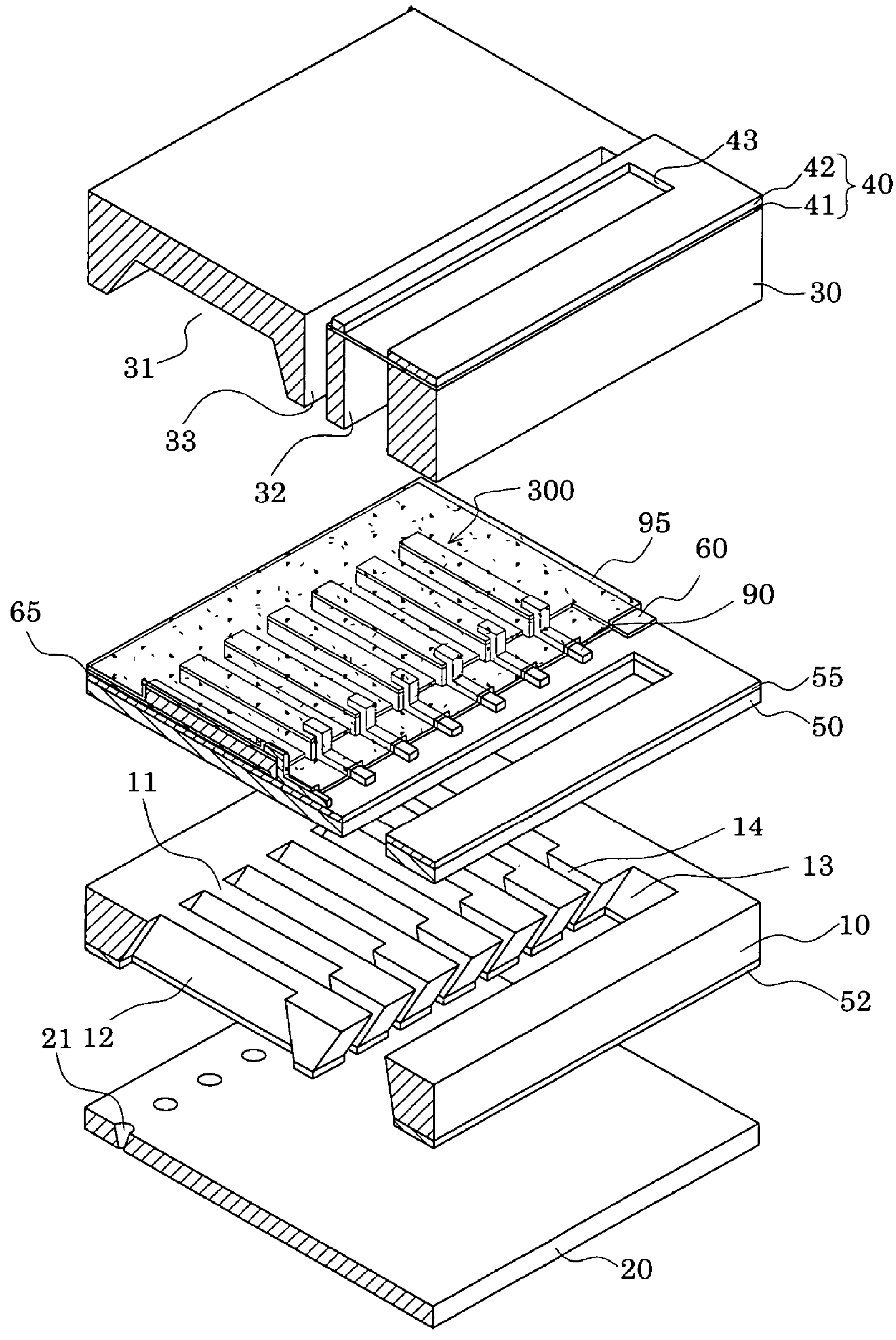
FIG. 1 is an Exploded perspective view showing the schematic configuration of a recording head according to Embodiment 1 of the invention.
Figure 2A:
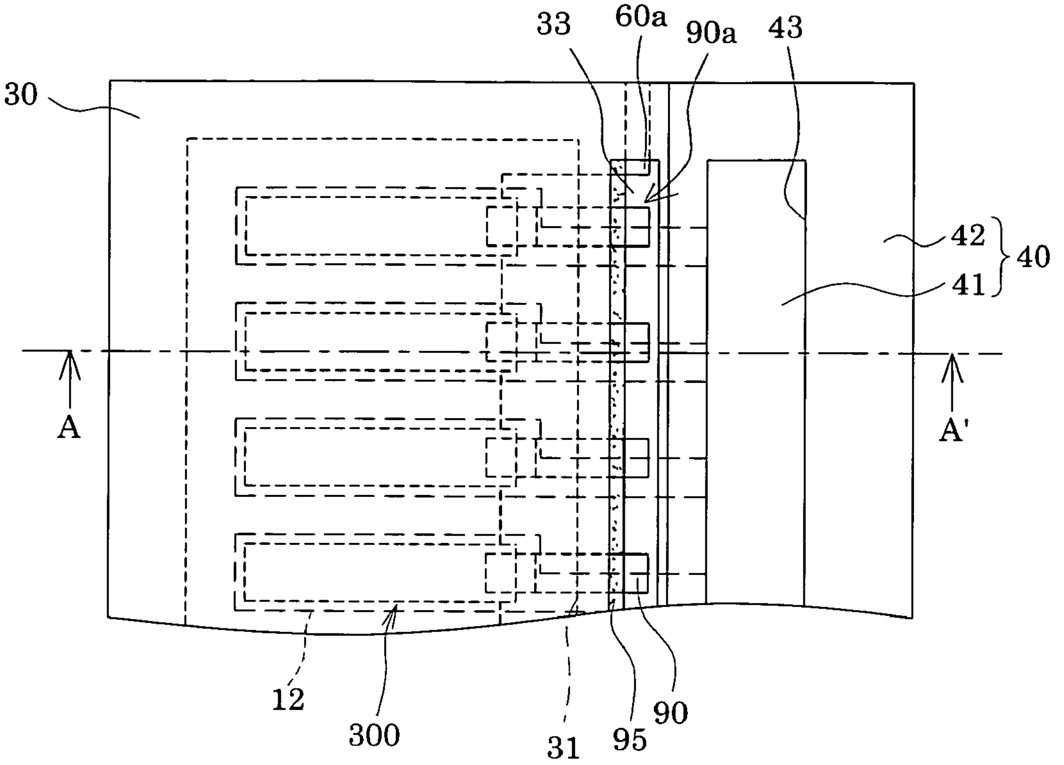
FIGS. 2A and 2B are a plan view and a sectional view of the recording head according to Embodiment 1 of the invention.
Figure 2B:
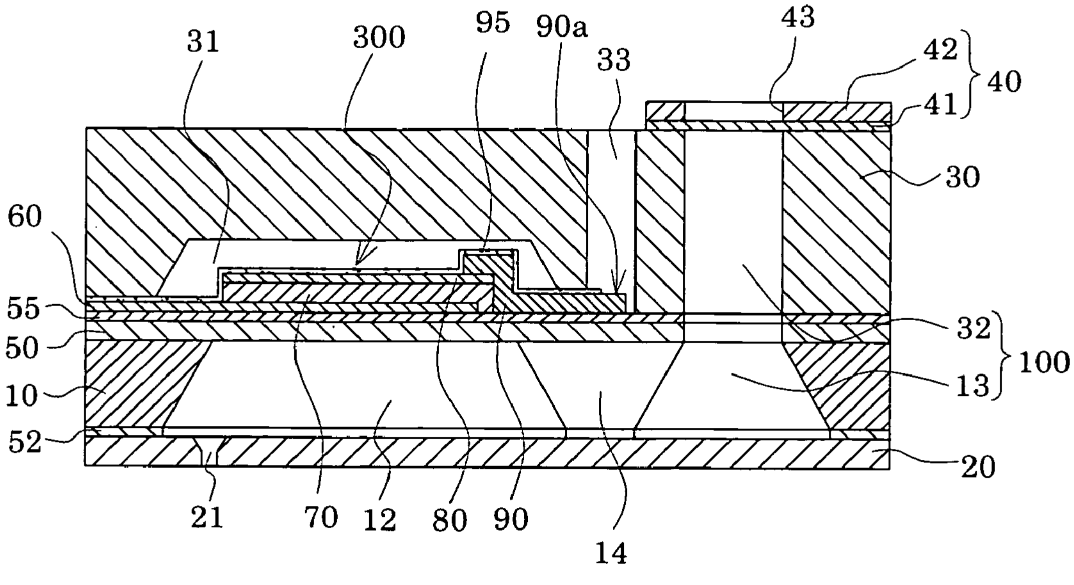

FIG. 1 is an exploded perspective view showing the schematic configuration of an ink-jet recording head according to Embodiment 1 of the invention. FIGS. 2A and 2B are a plan view and a sectional view taken on line A-A' of FIG. 1. As shown in these drawings, a passage-forming substrate 10, in the present embodiment, consists of a single crystal silicon substrate having a plane (110) of the plane orientation. An elastic film 50 comprising silicon dioxide and having a thickness of 0.5 to 2 μm, formed beforehand by thermal oxidation, is present on one surface of the passage-forming substrate 10. In the passage-forming substrate 10, a plurality of pressure generating chambers 12 defined by compartment walls 11 are disposed parallel in the width direction of the passage-forming substrate 10. A communicating portion 13 is formed in a region of the passage-forming substrate 10 which is longitudinally outward of the pressure generating chambers 12. The communicating portion 13 and each of the pressure generating chambers 12 are brought into communication via an ink supply path 14 provided for each of the pressure generating chambers 12. The communicating portion 13 communicates with a reservoir portion of a protective plate (to be described later) to constitute a reservoir serving as a common ink chamber for the respective pressure generating chambers 12. The ink supply path 14 is formed in a narrower width than that of the pressure generating chamber 12, and keeps constant the passage resistance of ink flowing from the communicating portion 13 into the pressure generating chamber 12.

Onto an opening surface of the passage-forming substrate 10, a nozzle plate 20 having nozzle orifices 21 bored therein is secured by an adhesive agent or a heat sealing film via a mask film 52 (to be described later). Each of the nozzle orifices 21 communicates with the vicinity of the end of the pressure generating chamber 12 on the side opposite to the ink supply path 14. The nozzle plate 20 comprises, for example, a glass ceramic, a single crystal silicon substrate, or stainless steel.

On the surface of the passage-forming substrate 10 opposite to the opening surface, the elastic film 50 having a thickness, for example, of about 1.0 μm and comprising silicon dioxide is formed, as described above. An insulation film 55 having a thickness, for example, of about 0.4 μm and comprising zirconium oxide ($ZrO_2$) is formed on the elastic film 50 by lamination. On the insulation film 55, there is formed a piezoelectric element 300 composed of a lower electrode film 60 with a thickness, for example, of about 0.1 to 0.2 μm, a piezoelectric layer 70 with a thickness, for example, of about 0.5 to 5 μm, and an upper electrode film 80 with a thickness, for example, of about 0.05 μm. That is, in this invention, a vibration plate has the oxide film, and the piezoelectric element 300 is formed on the oxide film. Generally, one of the electrodes of the piezoelectric element 300 is used as a common electrode, and the other electrode and the piezoelectric layer 70 are constructed for each pressure generating chamber 12 by patterning. In the present embodiment, the lower electrode film 60 is used as the common electrode for the piezoelectric elements 300, while the upper electrode film 80 is used as an individual electrode of each piezoelectric element 300. However, there is no harm in reversing their usages for the convenience of a drive circuit or wiring. Herein, the piezoelectric elements 300 and a vibration plate, where displacement is caused by driving of the piezoelectric elements 300, are referred to collectively as an actuator device.

A lead electrode 90 comprising, for example, gold (Au) is connected to the upper electrode film 80 of each piezoelectric element 300. Voltage is selectively applied to each piezoelectric element 300 via the lead electrode 90.

In the present embodiment, the pattern region including the respective layers of the piezoelectric element 300 and the lead electrode 90 is covered with an insulation film 95 comprising an insulation material, with the exception of a region opposed to a connection portion 60*a* of the lower electrode film 60 and a connection portion 90*a* of the lead electrode 90. That is, except the connection portions 60*a* and 90*a*, the surfaces of the lower electrode film 60, the piezoelectric layer 70, the upper electrode film 80, and the lead electrode 90 are covered with the insulation film 95. This prevents the destruction of the piezoelectric layer 70 due to moisture. The material for the insulation film 95 is not restricted, as long as it is an inorganic insulation material. For example, aluminum oxide ($Al_2O_3$), tantalum pentoxide ($Ta_2O_5$), etc. can be named, and it is preferred to use aluminum oxide ($Al_2O_3$), in particular.

To the passage-forming substrate 10 where the piezoelectric elements 300 have been formed, a protective plate 30, which has in a region opposite the piezoelectric elements 300 a piezoelectric element holding portion 31 for protecting the piezoelectric elements 300, is bonded by an adhesive agent or the like. The piezoelectric element holding portion 31 may be one ensuring enough space so that the movement of the piezoelectric elements 300 is not impeded, and this space may be sealed or unsealed. In the protective plate 30, moreover, a reservoir portion 32 is provided in a region opposed to the communicating portion 13. As mentioned above, the reservoir portion 32 is brought into communication with the communicating portion 13 of the passage-forming substrate 10 to constitute a reservoir 100 which serves as a common ink chamber for the respective pressure generating chambers 12. In a region of the protective plate 30 defined between the piezoelectric element holding portion 31 and the reservoir portion 32, a through-hole 33 is provided which penetrates the protective plate 30 in its thickness direction. A portion of the lower electrode film 60 and a front end portion of the lead electrode 90 are exposed in the through-hole 33. One end of connecting wiring extending from a drive IC is connected to the lower electrode film 60 and the lead electrode 90, although this is not shown.

As the material for the protective plate 30, it is preferred to use a material having nearly the same thermal expansion coefficient as that of the passage-forming substrate 10, for example, glass, a ceramic material, or the like. In the present embodiment, the protective plate 30 is formed from a single crystal silicon substrate which is the same material as that for the passage-forming substrate 10.

A compliance plate 40, which consists of a sealing film 41 and a fixing plate 42, is bonded onto the protective plate 30. The sealing film 41 comprises a low rigidity, flexible material (for example, a polyphenylene sulfide (PPS) film of 6 μm in thickness), and the sealing film 41 seals one surface of the reservoir portion 32. The fixing plate 42 is formed from a hard material such as a metal (for example, stainless steel (SUS) of 30 μm in thickness). A region of the fixing plate 42 opposed to the reservoir 100 defines an opening portion 43 completely deprived of the plate in the thickness direction. Thus, one surface of the reservoir 100 is sealed only with the sealing film 41 having flexibility.

With the ink-jet recording head of the present embodiment described above, ink is taken in from an external ink supply unit (not shown), and the interior of the head ranging from the reservoir 100 to the nozzle orifices 21 is filled with the ink. Then, according to recording signals from the drive IC, voltage is applied between the lower electrode film 60 and the upper electrode film 80 corresponding to the pressure generating chamber 12 to flexibly deform the elastic film 50, the lower electrode film 60 and the piezoelectric layer 70. As a result, the pressure inside the pressure generating chamber 12 rises to eject ink droplets through the nozzle orifice 21.

Figure 3A:
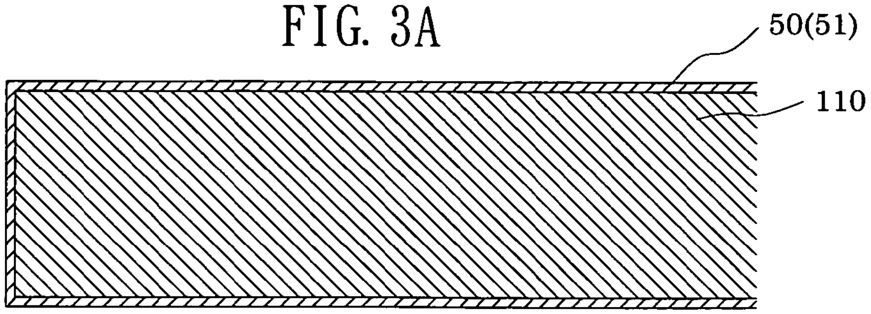
FIGS. 3A to 3D are sectional views showing a method for producing the recording head according to Embodiment 1 of the invention.

The method for producing the above-mentioned ink-jet recording head will be described with reference to FIGS. 3A to 3D through FIGS. 6A to 6D. FIGS. 3A to 3D through FIGS. 6A to 6D are sectional views in the longitudinal direction of the pressure generating chamber 12. First, as shown in FIG. 3A, a passage-forming substrate wafer 110, which is a silicon wafer, is thermally oxidized in a diffusion furnace at about 1,100° C. to form a silicon dioxide film 51 constituting the elastic film 50 on the surface of the wafer 110. In the present embodiment, a silicon wafer having a relatively large thickness of about 625 μm and having high rigidity is used as the passage-forming substrate wafer 110.

Figure 3B:
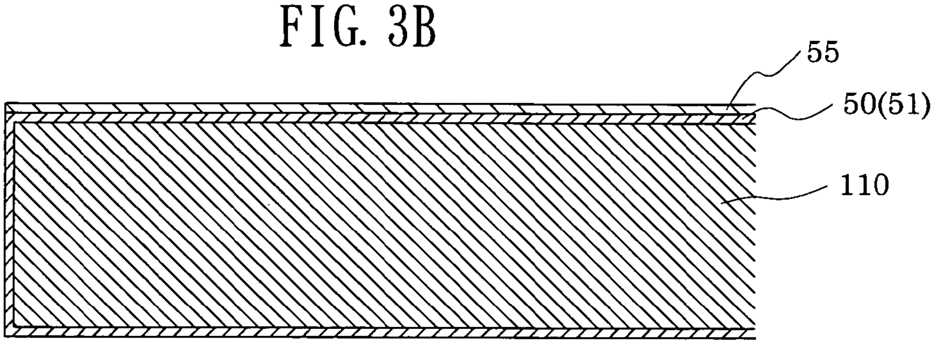

Then, as shown in FIG. 3B, the insulation film 55 comprising zirconium oxide is formed on the elastic film 50 (silicon dioxide film 51). Concretely, a zirconium (Zr) layer is formed on the elastic film 50 (silicon dioxide film 51), for example, by sputtering. Then, the zirconium layer is thermally oxidized, for example, in a diffusion furnace at 500 to 1,200° C. to form the insulation film 55 comprising zirconium oxide ($ZrO_2$).

Figure 3C:
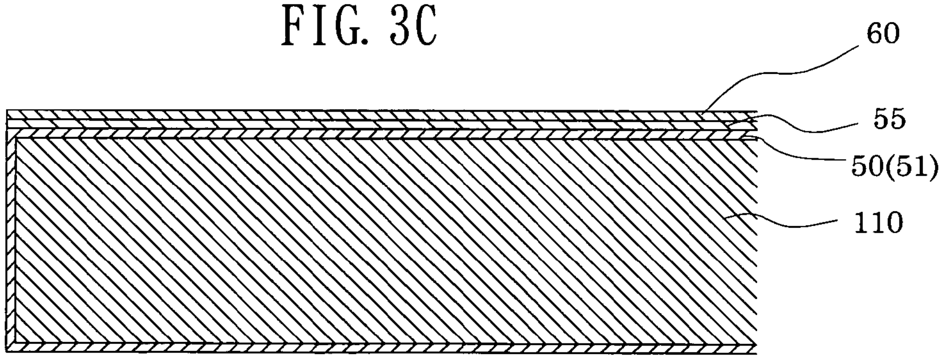

Then, as shown in FIG. 3C, the lower electrode film 60 comprising, for example, platinum (Pt), iridium (Ir), etc., is formed on the entire surface of the insulation film 55, and then patterned into a predetermined shape. In the present embodiment, for example, a film comprising iridium and a film comprising platinum are laminated by sputtering, and a plurality of the films laminated are patterned into a predetermined shape to form the lower electrode film 60.

Figure 3D:
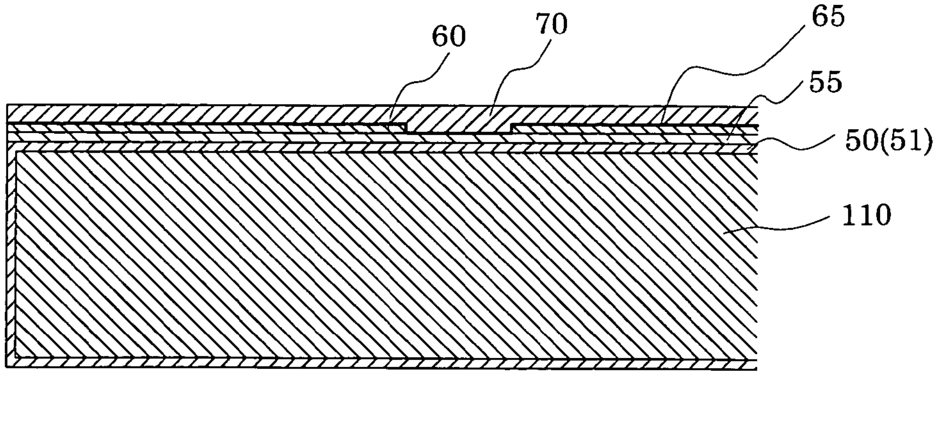

Then, as shown in FIG. 3D, titanium (Ti) is coated onto the lower electrode film 60 and the insulation film 55, for example, by sputtering to form a seed titanium layer 65 having a predetermined thickness. Then, the piezoelectric layer 70 comprising a piezoelectric material, lead zirconate titanate (PZT) in the present embodiment, is formed on the seed titanium layer 65. In the present embodiment, the piezoelectric layer 70 is formed by the so-called sol-gel process which comprises dissolving or dispersing metal organic materials in a catalyst to form a sol, coating and drying the sol to form a gel, and firing the gel at a high temperature to obtain the piezoelectric layer 70 comprising the metal oxide. The method of producing the piezoelectric layer 70 is not limited to the sol-gel process, and may, for example, be MOD (metal-organic decomposition).

Figure 4A:
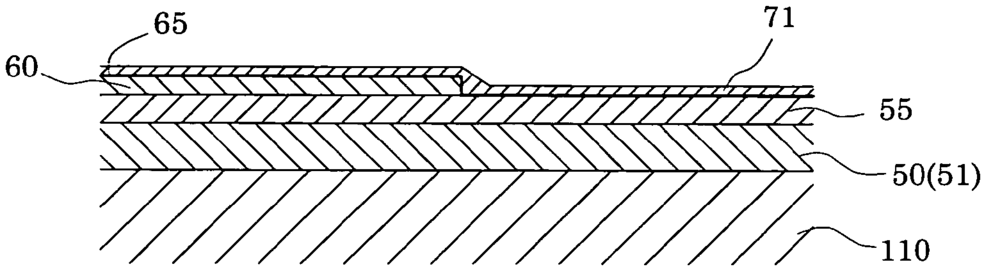
FIGS. 4A to 4C are sectional views showing the method for producing the recording head according to Embodiment 1 of the invention.

In an example of the procedure for formation of the piezoelectric layer 70, a piezoelectric precursor film 71, which is a PZT precursor film, is laminated on the seed titanium layer 65, as shown in FIG. 4A. That is, a sol (solution) containing a metallic organic compound is coated on the passage-forming substrate wafer 110. Then, the piezoelectric precursor film 71 is heated to a predetermined temperature and dried for a certain time to evaporate the solvent of the sol, thereby drying the piezoelectric precursor film 71. Further, the piezoelectric precursor film 71 is degreased for a certain time at a certain temperature in an air atmosphere. Degreasing refers to releasing the organic components of the sol film, for example, as $NO_2$, $CO_2$, $H_2O$, etc.

Figure 4B:
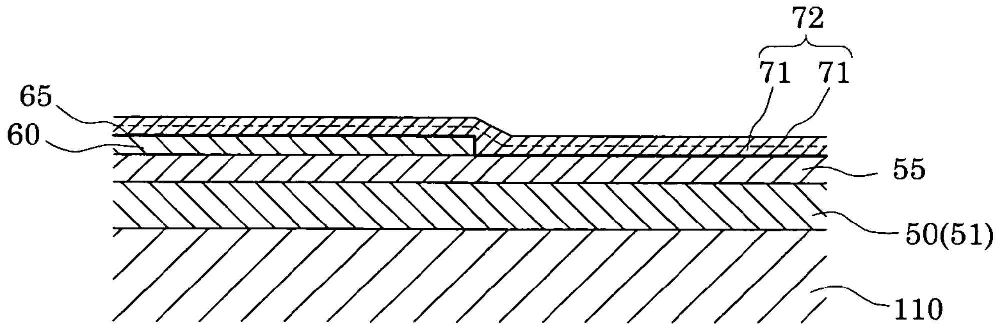

Such a process comprising coating, drying and degreasing is performed a plurality of times, for example, twice. By so doing, as shown in FIG. 4B, the piezoelectric precursor film 71 is formed to a predetermined thickness, and the resulting piezoelectric precursor film 71 is heat-treated in a diffusion furnace or the like for crystallization, thereby forming a piezoelectric film 72. That is, the piezoelectric precursor film 71 is fired to grow crystals, with the seed titanium layer 65 as a nucleus, whereby the piezoelectric film 72 is formed. The firing temperature is preferably 650 to 850° C. and, in the present embodiment, for example, the piezoelectric precursor film 71 is fired for 30 minutes at about 700° C. to form the piezoelectric film 72. The crystals of the piezoelectric film 72 formed under these conditions show preferred orientation in the (100) plane.

Figure 4C:
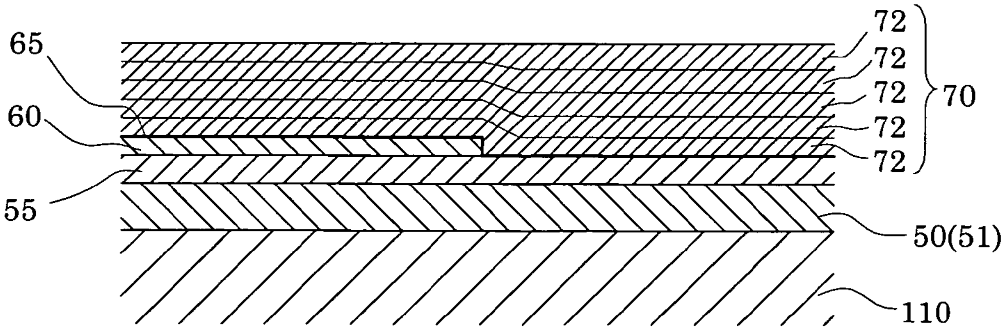

The foregoing process consisting of coating, drying, degreasing and firing is further repeated a plurality of times to form the piezoelectric layer 70 of a predetermined thickness composed of, for example, five of the piezoelectric films 72, as shown in FIG. 4C.

The material for the piezoelectric layer 70 may be, for example, a relaxor ferroelectric having a metal, such as niobium, nickel, magnesium, bismuth or yttrium, added to a ferroelectric piezoelectric material such as lead zirconate titanate (PZT). The composition of the piezoelectric layer 70 may be chosen, as appropriate, in consideration of the characteristics, uses, etc. of the piezoelectric element. Its examples are $PbTiO_3$ (PT), $PbZrO_3$ (PZ), $Pb(Zr_xTi_{1-x})O_3$ (PZT), $Pb(Mg_{1/3}Nb_{2/3})O_3$—$PbTiO_3$ (PMN—PT), $Pb(Zn_{1/3}Nb_{2/3})O_3$—$PbTiO_3$ (PZN—PT), $Pb(Ni_{1/3}Nb_{2/3})O_3$—$PbTiO_3$ (PNN—PT), $Pb(In_{/2}Nb_{2/3})O_3$—$PbTiO_3$ (PIN—PT), $Pb(Sc_{1/3}Ta_{2/3})O_3$—$PbTiO_3$ (PST—PT), $Pb(Sc_{1/3}Nb_{2/3})O_3$—$PbTiO_3$ (PSN—PT), $BiScO_3$—$PbTiO_3$ (BS—PT), and $BiYbO_3$—$PbTiO_3$ (BY—PT).

Figure 5A:
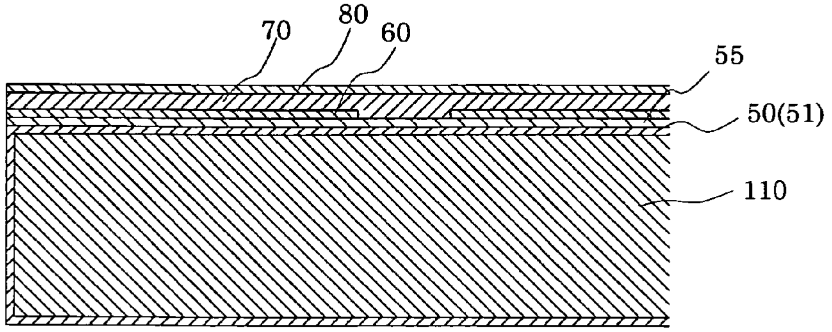
FIGS. 5A to 5D are sectional views showing the method for producing the recording head according to Embodiment 1 of the invention.

After the piezoelectric layer 70 is formed in the above manner, the upper electrode film 80 comprising, for example, iridium (Ir), is formed on the entire surface of the passage-forming substrate wafer 110, as shown in FIG. 5A. At this time, according to the invention, the upper electrode film 80 is formed to have a thickness of 30 to 100 (nm), stress of 0.3 to 2.0 (GPa) and specific resistance of 2.0 ($\times 10^{-7}$ Ω·m) or less by sputtering, for example, DC or RF sputtering. Here, the stress in the direction of tension is indicated by a positive value, and the stress in the direction of compression is indicated by a negative value.

To impart the above values to the stress and the specific resistance of the upper electrode film 80, the sputtering pressure during the lamination of the upper electrode film 80 is set at 0.4 to 1.5 (Pa), and the temperature during the lamination of the upper electrode film 80, namely, the heating temperature of the passage-forming substrate wafer 110, is set at 25° C. (room temperature) to 250° C. Under these conditions, the upper electrode film 80 is formed in a thickness of 30 to 100 (nm), whereby the stress of the upper electrode film 80 can be given the desired value. The specific resistance can also be given the desired value. Moreover, the temperature during the lamination of the upper electrode film 80 is set at 25° C. (room temperature) to 250° C., whereby damage to the piezoelectric layer 70 due to heat during the formation of the upper electrode film 80 can be prevented to maintain satisfactory piezoelectric characteristics of the piezoelectric layer 70.

The power density during lamination of the upper electrode film by sputtering is not limited, but preferably is set at 3 to 30 (kW/m$^2$). By so doing, the upper electrode film 80 having the stress and specific resistance of the above-mentioned values can be formed more reliably.

By laminating the upper electrode film 80 under the above conditions, the specific resistance of the upper electrode film 80 can be rendered 2.0 (×10$^{-7}$ Ω·m) or less. Alternatively, the specific resistance of the upper electrode film 80 can be adjusted, for example, by changing the pressure of a gas, such as argon (Ar), introduced during the lamination of the upper electrode film 80 by sputtering.

Figure 5B:
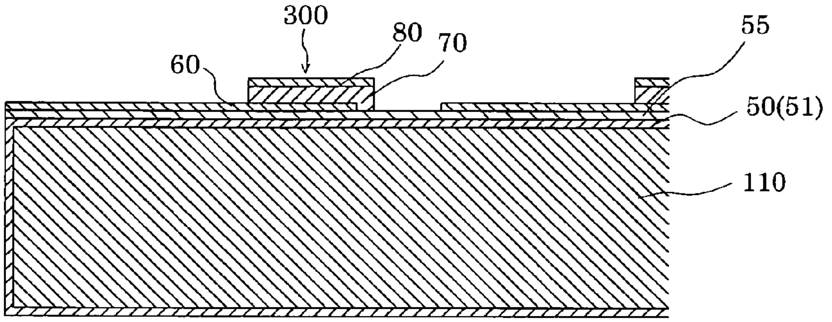
Figure 5C:
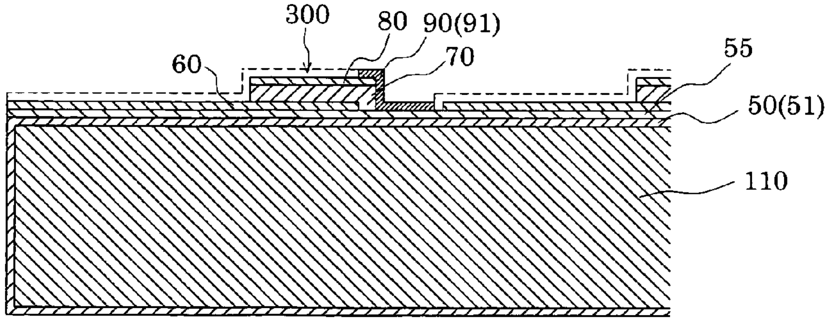

After formation of the upper electrode film 80 in the above manner, the piezoelectric layer 70 and the upper electrode film 80 are patterned in a region opposed to the respective pressure generating chambers 12 to form the piezoelectric elements 300, as shown in FIG. 5B. After the formation of the piezoelectric elements 300, a metal layer 91 comprising, for example, gold (Au) is formed on the entire surface of the passage-forming substrate wafer 110, as shown in FIG. 5C. Then, the metal layer 91 is patterned for the respective piezoelectric elements 300 via a mask pattern (not shown) comprising, for example, a resist to form the lead electrodes 90.

Figure 5D:
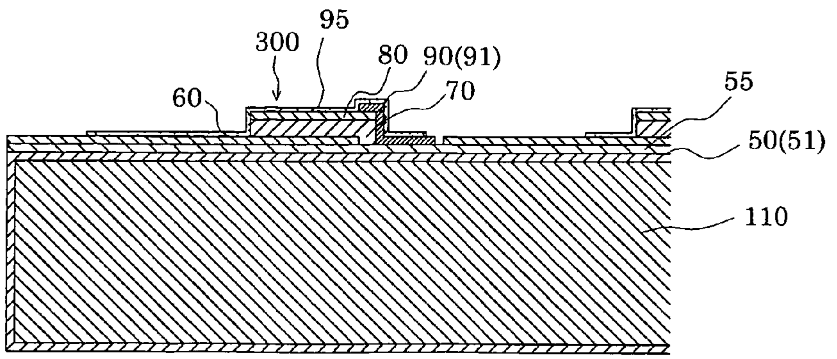

Then, as shown in FIG. 5D, the insulation film 95 comprising, for example, aluminum oxide ($Al_2O_3$) is formed. That is, the insulation film 95 is formed on the entire surface of the passage-forming substrate wafer 110. Then, the resulting insulation film 95 is patterned by dry etching, such as ion milling, to expose a region which will become the connection portion 60*a* of the lower electrode film 60 and the connection portion 90*a* of the lead electrode 90.

Figure 6A:
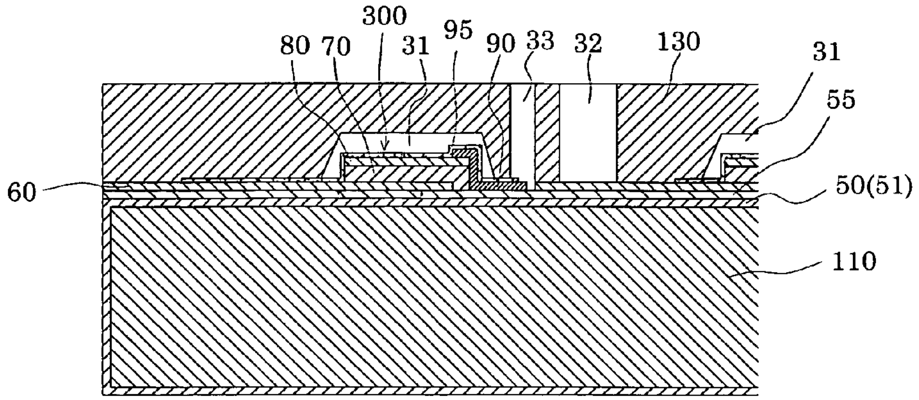
FIGS. 6A to 6D are sectional views showing the method for producing the recording head according to Embodiment 1 of the invention.

Then, as shown in FIG. 6A, a protective plate wafer 130, which is a silicon wafer and is to become a plurality of protective plates 30, is bonded onto a surface of the passage-forming substrate wafer 110 where the piezoelectric elements 300 have been formed. The protective plate wafer 130 has a thickness, for example, of the order of 400 μm, and thus the rigidity of the passage-forming substrate wafer 110 is markedly increased by bonding the protective plate wafer 130 thereto.

Figure 6B:
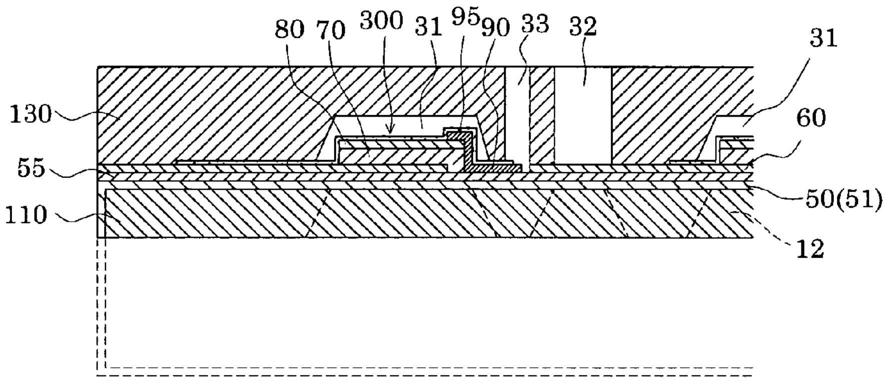
Figure 6C:
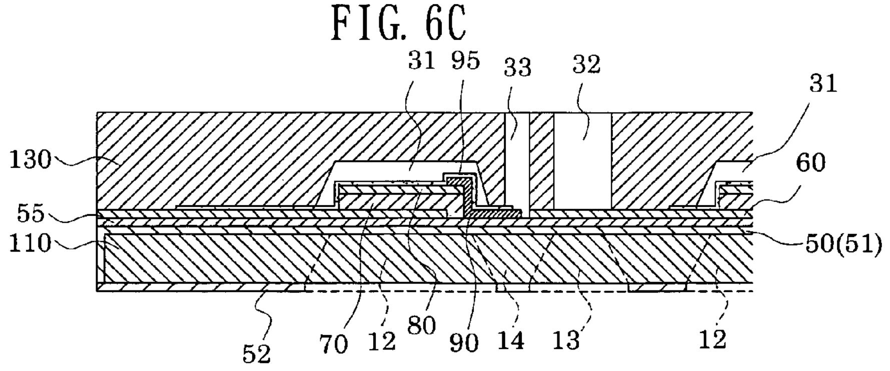
Figure 6D:
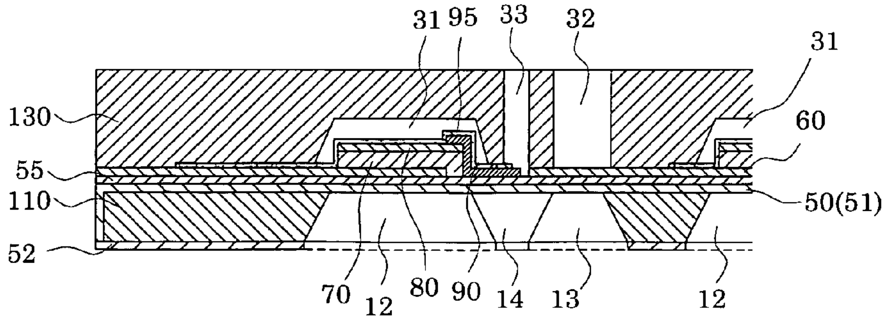

Then, as shown in FIG. 6B, the passage-forming substrate wafer 110 is polished to a certain thickness, and then is wet-etched with fluoronitric acid to bring the passage-forming substrate wafer 110 into a predetermined thickness. In the present embodiment, for example, the passage-forming substrate wafer 110 is etched to have a thickness of about 70 μm. Then, as shown in FIG. 6C, the mask film 52 comprising, for example, silicon nitride (SiN) is formed anew on the passage-forming substrate wafer 110, and is patterned into a predetermined shape. Then, the passage-forming substrate wafer 110 is subjected to an isotropic etching via the mask film 52 to form the pressure generating chambers 12, the communicating portion 13 and the ink supply paths 14 in the passage-forming substrate wafer 110, as shown in FIG. 6D.

Then, unnecessary regions of the outer peripheral edge portions of the passage-forming substrate wafer 110 and the protective plate wafer 130 are removed, for example, by cutting by means of dicing. Then, the nozzle plate 20 having the nozzle orifices 21 bored therein is bonded to the surface of the passage-forming substrate wafer 110 opposite to the protective plate wafer 130, and the compliance plate 40 is bonded to the protective plate wafer 130. The passage-forming substrate wafer 110 including the other members is divided into the passage-forming substrate 10, etc. of one-chip size as shown in FIG. 1 to produce the ink-jet recording head of the present embodiment.

In the present invention, as described above, the upper electrode film 80 constituting the piezoelectric element 300 is formed to have a thickness of 30 to 100 (nm), stress of 0.3 to 2.0 (GPa), and specific resistance of 2.0 (×10$^{-7}$ Ω·m) or less. Because of these features, the adhesion between the upper electrode film 80 and the piezoelectric layer 70 is enhanced to prevent the delamination of the upper electrode film 80, and the electrical characteristics of the piezoelectric layer 70 do not lower. That is, the upper electrode film 80 is apt to peel off if its stress in the direction of compression is high. If its stress in the direction of tension is high, on the other hand, the upper electrode film 80 minimally peels off, but the polarization characteristics of the piezoelectric layer 70 tend to decline. The formation of the upper electrode film 80 under the above-mentioned conditions results in the production of the piezoelectric element 300 satisfactory in both of the electrical characteristics of the piezoelectric layer 70 and the adhesion of the upper electrode film 80. As long as the specific resistance is 2.0 (×10$^{-7}$ Ω·m) or less, its lower-limit value is not set. However, the specific resistance is preferably 1.59 (×10$^{-7}$ Ω·m) or higher.

Furthermore, the upper electrode film 80 with such features has an improved film quality, and has a smooth surface substantially free from irregularities. Thus, the insulation film 95 is also formed satisfactorily in a uniform thickness on the upper electrode film 80. As a result, delamination of the insulation film 95 is also prevented. Hence, an actuator device excellent in displacement characteristics and durability is obtained, and an ink-jet recording head, which can maintain satisfactory printing quality for a long period, can be achieved.

Actuator devices of Examples 1 to 8 and Comparative Examples 1 to 15, in each of which an Ir film, the upper electrode film, was laminated under the lamination conditions shown in Table 1 offered below, were prepared. These actuator devices of the Examples and the Comparative Examples were each measured for the stress in the maximum warping direction of the upper electrode film, and the amount of displacement of the actuator device and the adhesion of the upper electrode film (TE) to the piezoelectric layer were evaluated. The results are all shown in Table 1.

If the amount of displacement of the actuator device is about 210 (nm) or less, the ejection characteristics of ink are affected in the structure of the above liquid-jet head. Thus, the amount of displacement of the actuator device was evaluated as “Good” if it was not less than 210 (nm), and “Decreased” (Poor) if it was less than 210 (nm). The adhesion of the upper electrode film (TE) to the piezoelectric layer was evaluated by observing the state of the upper electrode film at a stage where the actuator device was prepared, and judging whether delamination of the upper electrode film occurred, and whether there was a space between the upper electrode film and the piezoelectric layer. That is, the presence of the delamination and the space led to the evaluation “Decreased” (Poor), and their absence led to the evaluation “Good”.

TABLE 1

| | Ir lamination conditions | Ir specific resistance ($\times 10^{-7}$ Ω · m) | Stress in maximum warping direction (GPa) | Amount of displacement | TE adhesion |
|---|---|---|---|---|---|
| Ex. 1 | 25° C., 0.4 Pa, 30 kW/m$^2$ | 2.0 | 1.997 | Good | Good |
| Ex. 2 | 100° C., 0.4 Pa, 30 kW/m$^2$ | 2.0 | 1.828 | Good | Good |
| Ex. 3 | 250° C., 0.4 Pa, 30 kW/m$^2$ | 1.8 | 1.435 | Good | Good |
| Ex. 4 | 250° C., 0.4 Pa, 3 kW/m$^2$ | 1.6 | 0.396 | Good | Good |
| Ex. 5 | 250° C., 0.4 Pa, 7.5 kW/m$^2$ | 1.7 | 0.911 | Good | Good |
| Ex. 6 | 250° C., 0.4 Pa, 15 kW/m$^2$ | 1.7 | 1.349 | Good | Good |
| Ex. 7 | 250° C., 0.8 Pa, 30 kW/m$^2$ | 1.8 | 1.504 | Good | Good |
| Ex. 8 | 250° C., 1.5 Pa, 30 kW/m$^2$ | 1.8 | 1.483 | Good | Good |
| Comp. Ex. 1 | 250° C., 0.4 Pa, 3 kW/m$^2$ | 1.3 | −0.100 | Decreased | Good |
| Comp. Ex. 2 | 250° C., 0.4 Pa, 7.5 kW/m$^2$ | 1.4 | 0.156 | Decreased | Good |
| Comp. Ex. 3 | 350° C., 0.4 Pa, 15 kW/m$^2$ | 1.6 | 0.233 | Decreased | Good |
| Comp. Ex. 4 | 350° C., 0.4 Pa, 30 kW/m$^2$ | 1.6 | 0.631 | Decreased | Good |
| Comp. Ex. 5 | 350° C., 0.4 Pa, 60 kW/m$^2$ | 1.7 | 0.732 | Decreased | Good |
| Comp. Ex. 6 | 250° C., 3.0 Pa, 30 kW/m$^2$ | 1.9 | 1.362 | Good | Decreased |
| Comp. Ex. 7 | 25° C., 4.0 Pa, 30 kW/m$^2$ | 3.9 | −0.105 | Good | Decreased |
| Comp. Ex. 8 | 100° C., 4.0 Pa, 3 kW/m$^2$ | 2.8 | −0.549 | Good | Decreased |
| Comp. Ex. 9 | 150° C., 4.0 Pa, 3 kW/m$^2$ | 2.7 | −0.526 | Good | Decreased |
| Comp. Ex. 10 | 250° C., 4.0 Pa, 3 kW/m$^2$ | 1.3 | −0.738 | Good | Decreased |
| Comp. Ex. 11 | 350° C., 4.0 Pa, 3 kW/m$^2$ | 1.1 | −0.208 | Decreased | Decreased |
| Comp. Ex. 12 | 25° C., 4.0 Pa, 30 kW/m$^2$ | 2.1 | 2.232 | Good | Decreased |
| Comp. Ex. 13 | 150° C., 4.0 Pa, 30 kW/m$^2$ | 1.9 | 1.689 | Good | Decreased |
| Comp. Ex. 14 | 250° C., 4.0 Pa, 30 kW/m$^2$ | 1.8 | 1.277 | Good | Decreased |
| Comp. Ex. 15 | 350° C., 4.0 Pa, 30 kW/m$^2$ | 1.6 | 0.662 | Decreased | Decreased |

As Table 1 shows, in the actuator devices of Examples 1 to 8, the amount of displacement and the TE adhesion were both evaluated as “Good”, but in the actuator devices of Comparative Examples 1 to 15, at least one of the amount of displacement and the TE adhesion was evaluated as “Decreased”. These results show that according to the present invention, the adhesion between the upper electrode film 80 and the piezoelectric layer 70 can be enhanced to prevent the delamination of the upper electrode film 80, and the electrical characteristics of the piezoelectric layer 70 can also be maintained satisfactory.

Figure 7:
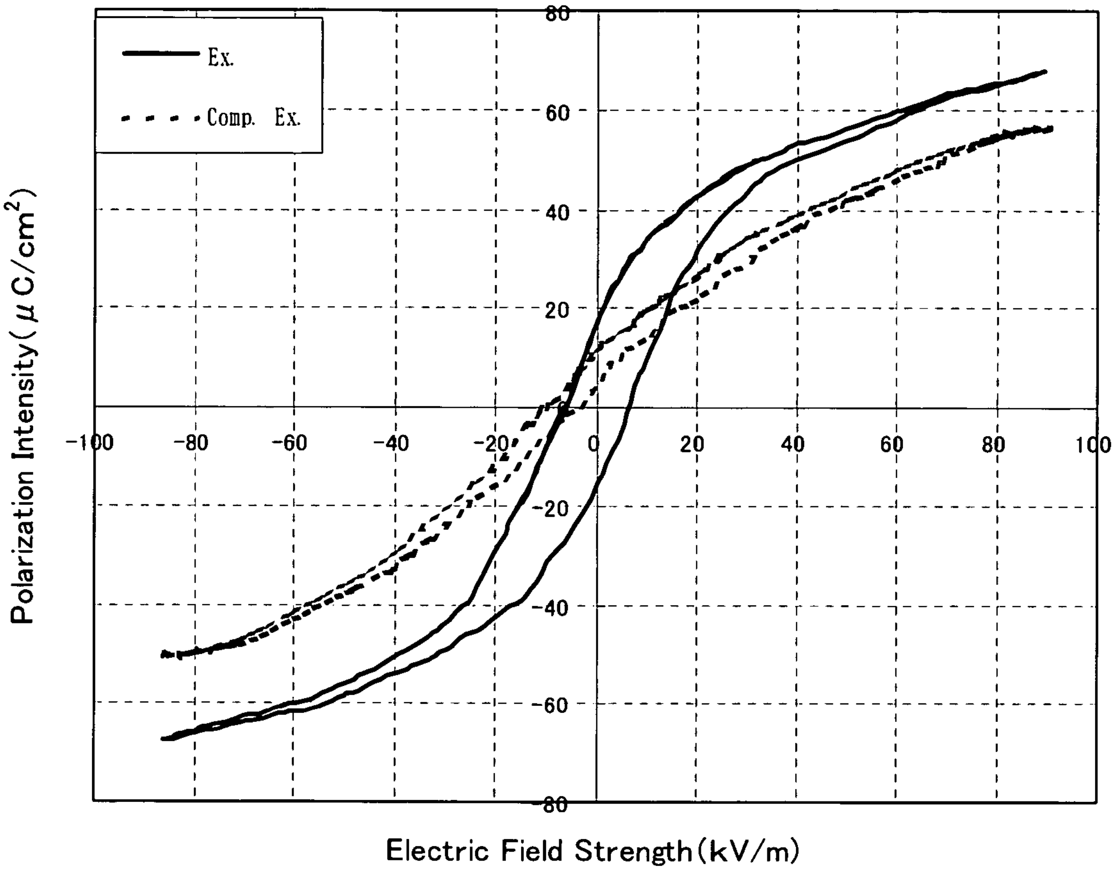
FIG. 7 shows the hysteresis curves of PZT thin films according to the Example and the Comparative Example.

From among the actuator devices of the Examples and the Comparative Examples, the actuator devices were arbitrarily selected (i.e., the actuator devices of Example 4 and Comparative Example 2), and the residual polarization (2 Pr) of the PZT thin film, the piezoelectric layer, of each of these actuator devices was examined. The results are shown in Table 2. Table 2 also shows the Ir lamination conditions, the Ir stress, the Ir specific resistance, and the amount of displacement of the actuator device. FIG. 7 shows the hysteresis curves of the PZT thin film (piezoelectric layer) in each of the actuator devices of the Example and the Comparative Example.

As Table 2 shows, the residual polarization (2 Pr) of the PZT thin film and the amount of displacement of the actuator in the actuator device of the Example both showed satisfactory values, but these values in the actuator device of the Comparative Example were both lower than those of the actuator device of the Example. The hysteresis curves of the PZT thin films illustrated in FIG. 7 show that the actuator device of the Example had higher polarization intensity than that of the actuator device of the Comparative Example.

The Example shown in Table 2 involved the sputtering pressure (Pa) of 0.4 (Pa), but needless to say, the sputtering pressure may be in the range of 0.4 to 1.5 (Pa). The temperature was 250° C., but may be 25 to 250° C. By adopting these conditions, the residual polarization (2 Pr) of the PZT thin film takes a reliably higher value than that of the Comparative Example.

The material for the upper electrode film 80 may be one using iridium (Ir). A concrete mode of the upper electrode film 80 is not limited to one comprising a single layer of iridium (Ir), but may be one comprising an alloy layer consisting essentially of iridium (Ir). Alternatively, the upper electrode film 80 may be composed of an iridium (Ir) layer or an alloy layer consisting essentially of iridium (Ir), and other

TABLE 2

| | Ir lamination conditions | Ir stress (GPa) | Ir specific resistance (Ω · m) | 2Pr of PZT film (μC/cm$^2$) | Amount of displacement |
|---|---|---|---|---|---|
| Ex. | 250° C., 0.4 Pa, 3 kW/m$^2$ | 0.396 | $1.592 \times 10^{-7}$ | 30 | Good(221 nm) |
| Comp. Ex. | 350° C., 0.4 Pa, 7.5 kW/m$^2$ | 0.156 | $1.449 \times 10^{-7}$ | 7 | Decreased(200 nm) |

layer laminated on a surface of the iridium (Ir) layer or the alloy layer which is opposite to its surface in contact with the piezoelectric layer 70.

Other Embodiments

The present invention has been described in connection with the above embodiment, but is not limited thereto.

Figure 8:
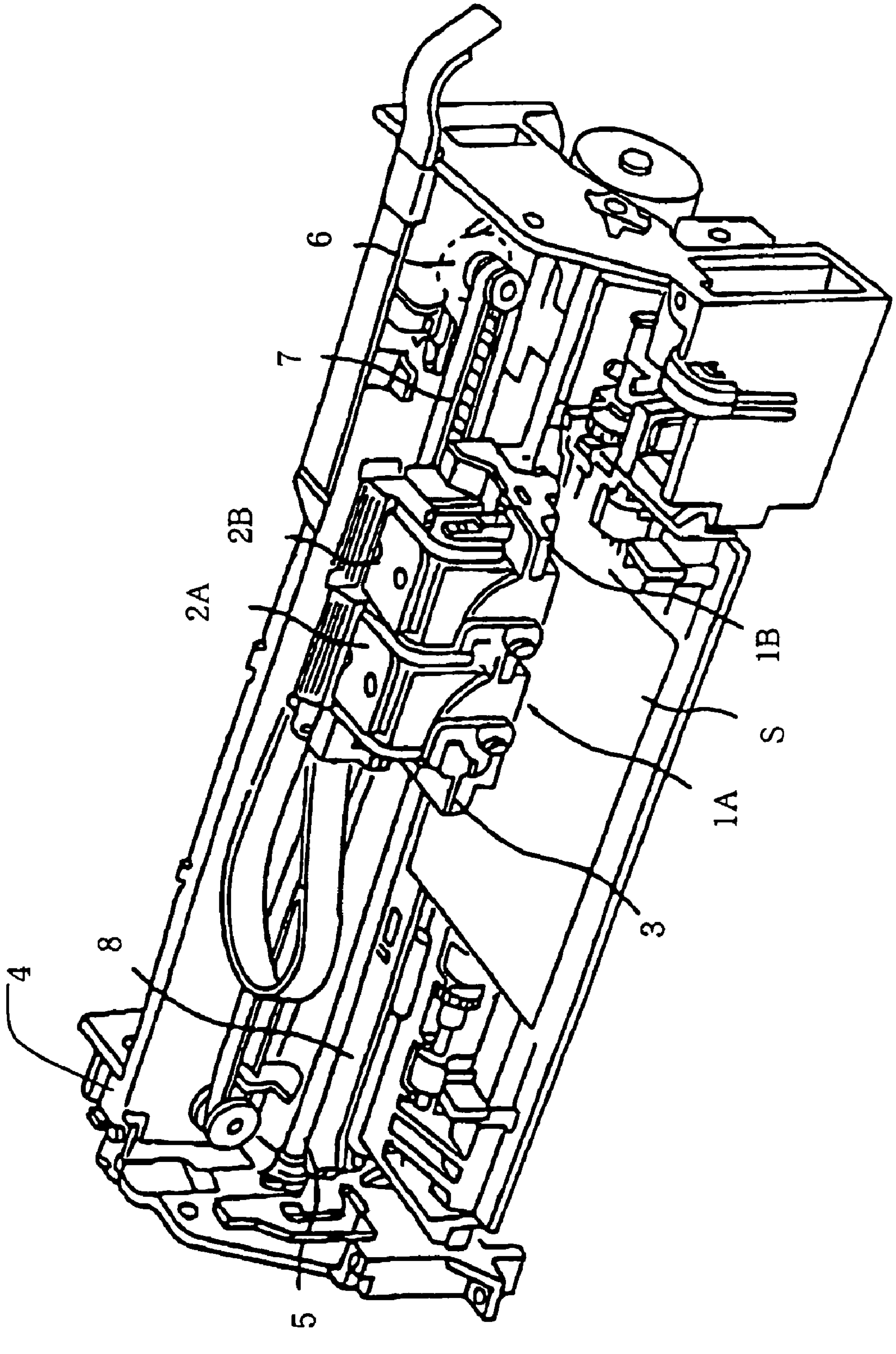
FIG. 8 is a schematic view of a recording apparatus according to an embodiment of the invention.

The ink-jet recording head of each of the embodiments is then mounted on an ink-jet recording apparatus as a part of a recording head unit having ink passages communicating with an ink cartridge, etc. FIG. 8 is a schematic view showing an example of this ink-jet recording apparatus. As shown in FIG. 8, cartridges 2A and 2B constituting ink supply units are detachably provided in recording head units 1A and 1B having the ink-jet recording heads, and a carriage 3 bearing the recording head units 1A and 1B is provided axially movably on a carriage shaft 5 mounted on an apparatus body 4. The recording head units 1A and 1B are to eject, for example, a black ink composition and a color ink composition, respectively.

The drive force of a drive motor 6 is transmitted to the carriage 3 via a plurality of gears (not shown) and a timing belt 7, whereby the carriage 3 bearing the recording head units 1A and 1B is moved along the carriage shaft 5. The apparatus body 4 is provided with a platen 8 along the carriage shaft 5, and a recording sheet S as a recording medium, such as paper, which has been fed by a sheet feed roller or the like (not shown), is transported on the platen 8.

In the above-described Embodiment 1, the ink-jet recording head is taken for illustration as an example of the liquid-jet head. However, the present invention widely targets liquid-jet heads in general. Thus, needless to say, the invention can be applied to liquid-jet heads for jetting liquids other than ink. Other liquid-jet heads include, for example, various recording heads for use in image recording devices such as printers, color material jet heads for use in the production of color filters such as liquid crystal displays, electrode material jet heads for use in the formation of electrodes for organic EL displays and FED (face emitting displays), and bio-organic material jet heads for use in the production of biochips. Furthermore, the invention can be applied not only to actuator devices for use in liquid-jet heads, but also to actuator devices for installation in all types of apparatuses, such as sensors. It should be understood that such changes, substitutions and alterations can be made therein without departing from the spirit and scope of the invention as defined by the appended claims.

What is claimed is:

1. A method for producing an actuator device, comprising the steps of: forming a vibration plate on a substrate; and forming a piezoelectric element composed of a lower electrode, a piezoelectric layer, and an upper electrode on the vibration plate, wherein in the step of forming the piezoelectric element, the upper electrode is formed on the piezoelectric layer by sputtering, a temperature of 25 to 250° C. and a pressure of 0.4 to 1.5 Pa are used during the sputtering, and upon the sputtering, the upper electrode having a thickness of 30 to 100 nm, stress of 0.3 to 2.0 GPa, and specific resistance of $2.0\times10^{-7}$ Ω·m or less is formed, and iridium is used as a material for the upper electrode.

2. The method according to claim 1, wherein a power density during formation of the upper electrode is set at 3 to 30 $kW/m^2$.

* * * * *